E. A. KWARNSTROM.
LOCK NUT.
APPLICATION FILED APR. 28, 1920.
1,405,138.  Patented Jan. 31, 1922.
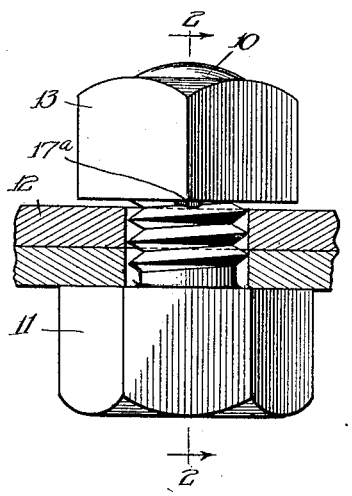
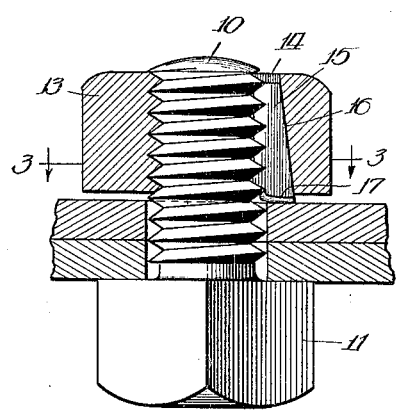
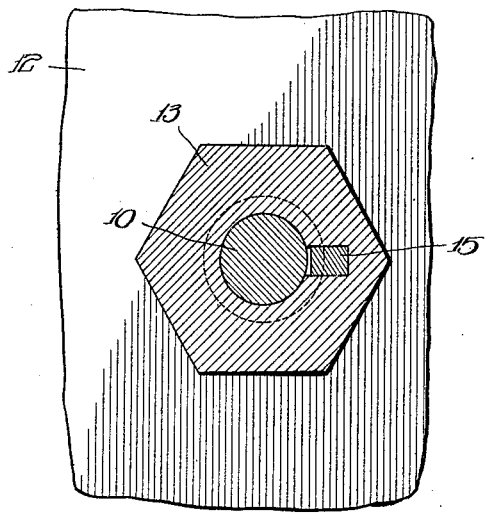
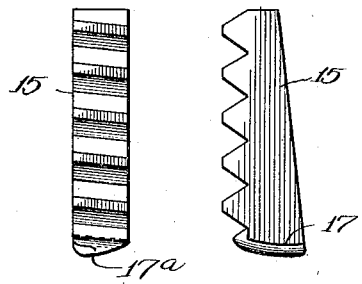
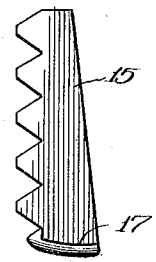
INVENTOR
Erik A. Kwarnstrom,
By Wilkinson Huxley Byron & Knight
ATTORNEYS
Witnesses:
R Burkhardt
Morton J Miller

UNITED STATES PATENT OFFICE.

ERIK A. KWARNSTROM, OF CHICAGO, ILLINOIS.

LOCK NUT.

1,405,138.  Specification of Letters Patent.  Patented Jan. 31, 1922.

Application filed April 28, 1920. Serial No. 377,143.

*To all whom it may concern:*

Be it known that I, ERIK A. KWARNSTROM, a citizen of the United States, residing at Chicago, in the county of Cook and State of Illinois, have invented certain new and useful Improvements in Lock Nuts, of which the following is a specification.

My invention relates to an improvement in lock nuts and has particular reference to a device wherein a threaded wedge member is adapted to lie within a longitudinally extending recess formed in the nut in such a manner that a wedging action will take place between the nut and the threaded portion of the bolt upon which the nut is carried. The wedge member is adapted to move with the nut until one of its ends which projects beyond the nut comes in contact with the member or plate against which the nut is turned whereupon the threads of the wedge member will exert a sidewise thrust upon the threads of the bolt, and will bite into the threads of the bolt, distorting them sufficiently to avoid being turned easily, and at the same time the wedge member is forced inwardly towards the bottoms of the threads of the bolt so that the nut is held securely in position on the bolt without being battered or without destruction of the threads to such an extent that the nut cannot be backed off the bolt without the use of a wrench.

It is well known that nuts become loosened upon bolts because of vibration and that the constant pressure due to the elasticity of the metal when a nut is screwed down tightly on a bolt is the normal means relied upon for holding a nut in position upon a bolt and that due to vibration there is a slight instant of time when the nut is out of contact with the metal and is, in effect, floating and at this particular instant the nut moves a very slight amount and with each succeeding vibration continues this slight movement until it becomes loosened.

In my improved lock nut, due to the wedge action which I obtain between the bolt and the nut, and the surface against which the wedge contacts, I am able to so lock and wedge the nut and the bolt together that any vibration, however slight, will be taken up by the wedge member and the nut will therefore not be carried freely, even for a slight instant, and, therefore, there is not the liability of a nut becoming loosened through vibration.

Another and further object of my invention is the provision of a device which is simple and efficient in operation, and which is easy to insert and can be manufactured in large quantities cheaply.

This and other objects of my invention will be more fully and better understood by reference to the accompanying sheet of drawings, in which:

Figure 1 is a view in elevation of my improved invention;

Figure 2 is a view partially in section of my improved lock nut;

Figure 3 is a view on line 3—3 of Figure 2;

Figure 4 is a view in elevation of the threaded side of my improved wedge member;

Figure 5 is a side view of the same member; and

Figure 6 is an end view of the wedge member.

Referring now specifically to the drawings, and in which like reference characters refer to like parts throughout, a threaded bolt 10 is shown having the usual head, the said bolt extending through a member 12. A threaded nut 13 is provided, the said nut having a transverse recess 14 extending therethrough and within which a threaded wedge member 15 is inserted. The outside wall 16 of the recess 14 is inclined so that as the wedge member 16 is moved transversely, as hereinafter described, the said member will be driven inwardly towards the bottoms of the threads upon the bolt 10 and will thus bite into the threads and securely hold the nut 13 in position. The member 15 is threaded in the same manner as the nut 13 and projects downwardly a slight distance below the edge of the nut 13 so that as the nut 13 is turned downwardly on the bolt the member 15 will come in contact with the surface of the member 12 and will thus cause the threads upon the member 15 to dig into the threads on the bolt by a movement parallel to the longitudinal axis of the bolt and will also move inwardly so that a wedging action is maintained at all times between the member 15 and the bolt 10. The lower end 17 of the wedge member 15 is curved and has a high projecting shoulder portion 17$^a$ which bites into the member 12 so as to securely hold the nut 13 against rotation, but making it easy when a wrench is applied to the nut 13 to turn the nut backward and back it off the bolt without the member 15 biting into the member 12 so deeply as to prevent rotation of the nut 13 or destroy the surface of the member 12 to such an extent that the nut 13 cannot be readily placed in position. The member 15 is threaded with the same size and standard threads as the threads of the nut 13 and it will be seen that as the nut 13 is placed upon the bolt 10 it is turned down into position until the member 15, which projects a slight distance beyond the edge of the nut 13, comes into contact with the member 12, whereupon a continued turning of the nut will force the nut downward over the member 15 which will be forced inwardly towards the center of the bolt and the threads to bite into the threads of the bolt and at the same time to slightly displace the threads upon the bolt, not, however, to such an extent that the nut cannot be backed off the bolt. The nut is turned down fast upon the bolt and the shoulder portion 17$^a$ of the wedge member 15 is thereupon caused to break into the surface of the member 12 to such an extent that the nut 13 is held securely in position and against any possibility of turning backwards off the bolt 10 and due to the elasticity of the metal any vibration will be taken up by the action of the wedge member 15 so that at no time will the nut 13 be out of contact or floating, even for a small instant of time, and the nut 13 will therefore be held securely upon the bolt at all times and under all conditions of service.

While I have described more or less precisely the details of construction, I do not wish to be understood as limiting myself thereto, as I contemplate changes in form and the proportion of parts and the substitutions of equivalents, as circumstances may suggest or render expedient without departing from the spirit or scope of my invention.

I claim:

1. In combination with a threaded bolt, of a nut having a recess extending therethrough parallel with the longitudinal axis of the said nut and in communication with the nut opening, of a threaded wedge shaped member in said recess extending beyond the inner end of said nut whereby when the nut is turned down tightly the said wedge member will be moved transversely of the said nut and inwardly towards the said bolt and into engagement with the side walls of the threads of the said bolt.

2. In combination with a threaded bolt, of a nut having a recess extending therethrough parallel with the bolt opening and in communication therewith, the side walls of the said recess being parallel and the outside wall extending at an angle with respect to the longitudinal axis of the nut, of a wedge shaped threaded member located in said recess and projecting beyond the inner face of said nut and in sliding engagement therewith, the outside edge of the said wedge member being parallel with the outside wall of the said recess whereby as the nut is turned down the wedge member is moved transversely of the said bolt and inwardly towards the said bolt and in interlocking engagement with the side walls of the threads thereof.

Signed at Chicago, Illinois, this 24th day of April, 1920.

ERIK A. KWARNSTROM.